US010169980B1

(12) United States Patent
Baker et al.

(10) Patent No.: US 10,169,980 B1
(45) Date of Patent: Jan. 1, 2019

(54) PORTABLE SECURITY BIN (71) Applicant: USA Technologies, Inc., Malvern, PA (US)

(72) Inventors: Tamara Baker, San Francisco, CA (US); Amedee Louis Beaudoin, Cambridge (GB); Edward Jansson, Canton, GA (US); Peter Lessels, Stratham, NH (US); Allan Stewart, San Francisco, CA (US); Mandeep Arora, San Francisco, CA (US); Justin Grant, Berkeley, CA (US); Michael Marett, San Francisco, CA (US)

(73) Assignee: USA Technologies, Inc., Malvern, PA (US)

( * ) Notice: Subject to any disclaimer, the term of this patent is extended or adjusted under 35 U.S.C. 154(b) by 0 days.

(21) Appl. No.: 15/901,195

(22) Filed: Feb. 21, 2018

(51) Int. Cl.
G08B 23/00 (2006.01)
G08B 25/00 (2006.01)
B65F 1/14 (2006.01)
B65F 1/16 (2006.01)
G08B 21/18 (2006.01)

(52) U.S. Cl.
CPC .......... G08B 25/008 (2013.01); B65F 1/1484 (2013.01); B65F 1/1615 (2013.01); G08B 21/182 (2013.01); B65F 2210/128 (2013.01); B65F 2210/138 (2013.01); B65F 2210/1443 (2013.01); B65F 2210/168 (2013.01); B65F 2240/1562 (2013.01)

(58) Field of Classification Search
CPC .................................. B65H 1/00; G06K 1/00
See application file for complete search history.

(56) References Cited

U.S. PATENT DOCUMENTS

| 2005/0131645 A1* | 6/2005 | Panopoulos | .......... B60P 1/5457 701/472 |
| 2010/0006649 A1* | 1/2010 | Bolton | ................... G07C 13/02 235/386 |

* cited by examiner

Primary Examiner — Shirley Lu
(74) Attorney, Agent, or Firm — RatnerPrestia (57) ABSTRACT A security bin and a security bin controller are described that measure fullness or height of secure contents in a security bin; listen to radio beacons over a short-range radio to determine a bin distance from a first radio, such as by measuring received radio power; determine one of three bin security states: home, caution or warning; and then broadcast a status message, warning message or alarm message over long-range radio, dependent on both the fullness of the bin and the security state. Embodiments include shredder bins, adapted to receive secure or confidential documents. Status messages may be used to initiate a search for a lost bin or to schedule bin service. Embodiments include measuring rate-of-fill. Alarm messages may be responsive to both bin location and fill volume. Embodiments and use of a controller include waste bins, including industrial or medical waste.

10 Claims, 5 Drawing Sheets

PORTABLE SECURITY BIN

BACKGROUND OF THE INVENTION

This invention relates security bins, particularly bins and enclosures for secure documents. Some, but not all, such bins are called, "shredder bins." Some security bins are portable. Some bins are used to maintain document security. A problem in the prior art is that such portable security bins are easily moved to locations other than their proper, or "home," locations.

Some such bins need to be emptied periodically. In the prior art, such bins were typically emptied on a fixed schedule. Such fixed schedules are inefficient and compromise the purpose of the security bin by either emptying more often than necessary, or not emptying a full bin, which often caused material that should have been placed into a bin to be left out of the bin.

SUMMARY OF THE INVENTION

Embodiments of this invention overcome weaknesses of the prior art.

Embodiments include security bins themselves, comprising an electronic controller; and controllers adapted to be affixed to security bins, typically inside the bin. Embodiments include methods of the controllers, and systems that include a plurality of security bins or security bin controllers. Some embodiments also include hardware and methods used in the emptying of bins.

Embodiments of controllers include both a short-range and a long-range radio. The short-range radio may be used to receive radio beacons, such as WiFi or Bluetooth broadcasts, and then measure received radio power of the beacons, or an associated broadcast radio, and then use the received radio power to compute a distance between a bin and a broadcast radio.

Embodiments compute a "security state," related to such a bin distance. There may be three such security states: "home," "caution," and "warning." A home state may be a bin's proper or permitted locations, or suitable close to such a location. A caution state may be farther way than a home location, but still within range of at least one beacon. A warning state may be yet farther away from a home state, out of range of a desired beacon, or out of range of all beacons.

Embodiments include hardware to measure the height of material in a bin. For example, for a shredder bin, the height, or "fullness" may be a distance between the top of the bin, or the bin controller, and the top of a paper stack in the enclosure. Other types of security bins may use other methods of measuring fullness.

Embodiments include power management. A bin controller may perform three tasks, for example, each on a regular basis, at different time intervals. One such task may be to measure fullness. A second such task may be to listen to beacons. A third such task may be to send one or more message via the long-range radio. A long range radio may be cellular data, for example. A type of message is a security state messages, which may be sent to indicate a change in security state. Another type of message may be a status message, which may be sent periodically or in response to a problem or a request to send a status message. Different message types may be implemented by data values or fields in a message.

Each such time interval may be different than other time intervals. To conserve power, such as battery life, it is desirable to make such time intervals as long as possible while still meeting the requirement of the device. Some embodiments dynamically adjust such time intervals, depending on current bin status. Some embodiments use predetermined time intervals depending on use and location of an associated enclosure.

Embodiments explicitly include bins other than paper bins. For example, bins may hold sharps, medical waste, industrial waste, scrap, other waste, or recyclable material.

DETAILED DESCRIPTION OF THE INVENTION

One typical, non-limiting scenario for a bin-controller device, system and method of using the device follows.

A bin controller may be optionally affixed to or in an enclosure, such as on the underside of a lockable bin lid. The bin controller monitors the fullness of the bin at a first regular time interval. The bin controller transmits a status message, comprising a bin ID, or controller ID, or a functional proxy ID, and a bin fullness metric, at a second regular time interval, which is typically less frequent than the first regular time interval, but maybe a shorter or longer interval. Such status transmissions may use either the short-range radio or the long-range radio, or both. These two time intervals may be set remotely, such as via a server, discussed elsewhere herein. A bin status message may contain additional information, such as battery status; battery voltage; service request from a service request button; receive and transmit radio power or signal strength for both short-range and long-range radios; self-test results; GPS coordinates; bin lid position; cellular device ID, such as a SIM card ID; software or firmware version; diagnostic or error information; or a bin location or movement history. Some embodiments use variable first or second, or both, time intervals; where a time interval is set by the bin controller or a remote server, or is set manually. For example, a bin that fills rapidly may use shorter time intervals that a bin that fills slowly. Such a variable time interval may be called an, "adaptive schedule." Note that such schedules may apply to either receiving, or transmitting, or both. Some embodiments use a different schedule for receiving and transmitting, even for a same radio. Some embodiments send varying length messages at differing time intervals, such as sending a brief or summary report message more frequently than a long, or full report message.

Some embodiments determine a bin location, or approximate location, by considering signal strength and radio ID of nearby, fixed beacons, on the short-range radio frequencies and protocols. A bin controller may send a status or service request message in response to a change in such beacon signal strength, or a change in a beacon ID, or loss of a beacon signal, or activation of a service request or service complete button or (an equivalent or similar) wireless input. Any and all trigger conditions or set points that cause a status message or service request message to be transmitted may be programmable remotely, such as via remote server or via the long-range radio, or both. In some embodiments beacons are separate from an associated broadcast radio.

The term, "message," is to be construed broadly. A single message, for example, may be broken into more than one packet. Contents of a message may be distributed among multiple transmissions. Functionally equivalent methods to perform a function are specifically included in construction of claims.

A short-range radio may be Bluetooth and a long-range radio may be cellular data; although many other radio frequencies and protocols are suitable; particularly as technology evolves. Regulatory and safety requirements may include US FCC regulations or foreign equivalents such as CCITT standards or regulation; UL (Underwriters Laboratory) requirements; cellular spectrum and power requirements; packaging, safety and ecological compliance such as RoHS (Restriction of Hazardous Substances, such as Directive 2002/95/EC (European Union)) and WEEE requirements (Waste Electrical and Electronic Equipment, such as 012/19/EU (European Union)).

Some embodiments use a locked bin lid. Such a lock may be mechanical or electronic, and may or may not be integrated into the bin controller. A lid positions sensor may be in some embodiments. The terms, "lock" or "lockable" need to be construed in the context of the embodiment and application. Some embodiments do not use a lock. Specifically claimed are embodiments with the word, "lock" or "lockable" deleted.

Size, shape, location and material of a bin controller enclosure should not block or interfere with insertion or storage of paper or other items inserted into the bin via the bin slot.

Operationally, once a bin is outfitted with a bin controller and the bin controller is provisioned, adapted or programmed for a particular function in a particular location, a typical embodiment of a method comprises the following exemplary steps.

The bin controller listens repetitively at a first time interval to "wake up", when it then may listen for one or more beacon radio signals, which may be adjusted dynamically, either locally under the control of the bin controller or set remotely via a remote server. It measures and records the beacon ID or radio ID and the received power, and optionally radio signal directionality. Such listening may be purely receive only, or a two-directional protocol may be used. Such signals may be unencrypted, e.g., "clear text;" or encrypted.

The bin controller measures paper height in the bin at a same or a second, different time interval, which may be adjusted dynamically, either locally under the control of the bin controller or set remotely via a remote server.

The bin controller repetitively transmits at a third time interval a bin status message using the long-range radio. Such status messages may comprise status information, or alert data, or service request data, in any combination. Any such status messages may also be transmitted via the short-range radio.

Some embodiments use three radios, such as Bluetooth, WiFi, and cellular data. Some embodiments use IR (infrared) for either transmit or receive, to replace the short-range radio, or for supplementary communication. Some embodiments use the receive signal strength or directionally of an infrared signal, or both, in place of or to supplement other location sensing elements or steps. Some embodiments use GPS (or other satellite based earth location protocols) to replace or supplement other location sensing elements or steps. Some embodiments use a camera viewing an environment of the bin, in conjunction with a database of such views, to replace or supplement other location sensing elements or steps.

A bin may have one or more "home locations" in a business or customer facility. Such a home location may be a single room or department, or may cover several rooms or a larger location. If a bin is no longer in its home location, this may indicate an operational problem, or a less-than-ideal condition, and should be detected and corrected. Home location is determined as a combination of location sensing, such as use of the beacons, in conjunction with stored information about the home location, including its extent and how such determination should be made. Determination of a home location, or nearby, or clearly outside the home location may be made remotely, such as by a remote server, or by the bin controller, or by a personal electronic device, such as one used by an employee or agent of the customer.

In one embodiment there are three classes of locations, or "security states," for a bin. There is a, "home location" or "safe location," which is where the bin is supposed to be located or is ideally located, unless it is being serviced. There is a, "caution location" typically at one or more borders of the home location, or past a predetermined distance from a broadcast radio. There is also an, "warning location," which is any location that is not the home location or a caution location, or an inability to determine location. A bin that in not in its home location, or in a caution location, may be identified as lost or, "rogue," or may be being serviced.

These three classes of locations are associated with three security states: home, caution, and warning.

Bins may be portable or fixed. However, even fixed bins typically can be moved. Some embodiments have more than one, "home location." Some embodiments have four or more security states, such as, "home," "caution," "warning," "alarm," "error," "in service," or "missing," in any combination. A "location class" may be the same as, or associated with a "security state." Alternative names for a "warning" security state are, "unsafe," "lost," "alarm," or "rogue." In some embodiments a "safe" location or security state is not identical to a "home" location or security state. For example, a safe location may be larger than a home location.

When a bin controller detects that it is no longer in a home location or in a safe security state, it sends a status message, caution message or a warning message. A security state may be part of a general, "status message." Such messages are typically sent immediately upon detection of such an event or trigger, rather than waiting for the associated time interval to expire. A delay from detection of a trigger condition to sending an appropriate message may be in the range of zero to one minute, or in the range of zero to 1 hour, or in the range of zero to one day.

Some embodiments include a visual or audio indictor, or a physical paper slot blocking mechanism, to indicate that the bin should no longer receive documents when it is no longer in its home location, or is in a warning location or warning security state.

The term, "slot," needs to be construed relative to the nature and purpose of the bin containing the slot. For example, slots for paper will be different than slots to receive medical sharps. Slots to receive industrial waste or scrap depend on the nature of the waste or scrap. Thus, "slot," needs to be interpreted quite broadly, dependent on the embodiment and intended application.

Ideally, the particular boundaries for each bin's security states, for each customer site, are determined specifically for that site and that customer's needs. Often such boundaries or thresholds between location classes or security states is not exact. For example, if a beacon power is used as part of location determination, beacon power may vary according to the relatively location of walls, orientation of the bin, radio interference and other factors. If GPS or a similar system is used as part of location determination, GPS has variable, and often poor, absolute accuracy. If a particular set of WiFi networks are within a reception range, those networks may come and go, or be replaced or repositioned. Ideally, for a given customer site, boundaries between location states or security states is related to the relative purpose and safety or a room. For example, all of HR (Human Resources) may be viewed as a "home" location, while anywhere outside of HR is a caution of warning location. As a second example, a break room may be considered a lower security location. Nearby hallways may be considered as caution locations, rather than warning locations. In some embodiments, when a bin is being serviced, another location or security state is used, such as an, "in service" state. In some embodiments, such a state has a limited time, such as in the range of one minutes to one hour. When that time is up, the bin automatically returns to one of its non "in service" security states. A bin may automatically return to a home location state when it detects that it is in its home location.

A bin service company may configure bins and a server, or both, for particular customer sites and bin locations, for a variety of actions when a bin reports a caution or warning security state:

- an alert is received by the bin service company, which then contacts an appropriate person at the customer site to asks them to go find the bin;
- at alert is received by the customer, which then has an appropriate person go find the bin;
- at alert is received by the bin service company, which then has an employee of the bin service company go find the bin during the next scheduled service;
- at alert is received by the bin service company and no immediate action is taken; during the next scheduled service an employee of the bin service company locates all bins, wherever they are, services them, and returns them to their home locations;
- when a bin detects a caution or warning (or other non-home) state, it generates an audible signal so that some person will hear the signal and return or caused to be returned the bin to its home location;
- at alert is received by the bin service company and it sends a message to the bin, by any communications protocol discussed herein, to cause it to generate an audible signal so that some person will hear the signal and return or caused to be returned the bin to its home location;
- ideally, an audible alert from a bin is automatically silenced when the bin is returned to an associated home location;
- in place of an audible alert, a message may be sent by the bin via WiFi, or by another third or fourth radio.

In some embodiments, a bin service company employee (or contractor or agent) may use their phone to communicate directly with a bin, such as via Bluetooth, cellular, WiFi, or optical. In some embodiments, a bin service company employee (or contractor or agent) may use their phone to communicate directly the bin service company server, which then, as appropriate or configured, contacts one or more bins via its regular message channels. In some embodiments, an employee of the customer may have such, or similar, or a subset of such capabilities.

A bin controller may respond to a received request to send a status message. Such a request may come via the short-range radio, the long-range radio, or via activation of a service request button on the bin.

A bin or bin controller may have a machine readable bar code. A bin may have a human readable identification on the outside of the bin.

Servicing a bin, most basically, comprises emptying a bin. Service may include any of many other services, such as cleaning, battery replacement, battery charging, testing, repair, programming, firmware updates, upgrades, provisioning. and the like.

Bins are sometimes in a position other than their normal, upright, operative orientation. We refer to this orientation as, "fallen." In addition to making a bin at least temporarily not useable, a fallen bin generally produces invalid status messages, such as being full, when it is not full, but rather has fallen. Also, location sensing may not be accurate for a fallen bin. Therefore, some embodiments have a fall sensor. These embodiments typically immediately sent a status message when a fall is detected. They also may use a local audible or visible alarm, so that a person at the customer site may upright the bin without the need for a service call. An accelerometer or orientation switch may be used in the bin controller for such fall detection. An accelerometer is also able to detect bin movement, which may be either movement, proper or improper, by customer employee, or by service personnel. A status message may include information about being fallen, moved, either as a current state or as part of a bin history.

It is valuable to the bin service company to have accurate information to optimally schedule a service trip, and to know which bins need to be emptied. Therefore, embodiments track a fill-rate on either a per-bin basis or a per-location basis, or both. For example, a bank might have several bins. They might fill at different rates, but the fill rate for a given bank location is relatively constant. Fill rate may be tracked for each bin by the bin controller, or by a remote server configured to this function. A location for the purpose of tracking a fill rate may be an entire customer site, a location for a single bin, or a set of locations for one or more bins.

Embodiments explicitly include tracking one or more fill-rates and then using this information to schedule a service trip, by a bin service company, to a customer site.

Embodiments include detection of a sudden change, or "jump" in a paper-height level in a bin. Such a sudden change is most often a result of employees at the location selecting for disposal an unusual number of documents, putting at risk full bins and confidential documents being disposed of improperly or not at all. A sudden change in paper-height level might also indicate that a bin is fallen; or the paper slot is jammed, or that some improper material has been placed into a bin, or that a controller is defective, or that the bin has been broken into. Typically, it is important that any sudden change in paper-height is investigated immediately. Either a bin controller or a server might detect such a jump. The sudden change could be either an increase or decrease.

Bin data must be closely associated with bin servicing. Typically, bins are wheeled down or transported to to a service vehicle at street level or at a loading dock. They may be emptied in the service vehicle, or they may be then transported to a central facility. Shredding or another operation on bin contents may be done in the bin, in the service vehicle, or in a central facility. In some cases, bins are swapped at the service vehicle. That is, a full bin in placed in the truck and is then replaced, at the home location, with a fresh, empty bin. It is undesirable that bins generate warning or alarm messages during such servicing. One embodiment sends messages to the bins that they are now in "service mode," which prevents them from sending warning or alarm messages, although they may continue to send regular status messages. Another embodiment sends bins that have been placed or replaced in a customer location with a "reset" signal, so that data such as bin fill rates is reset to a starting value. Such a signal may be via a button. In some embodiments, a recently replaced bin "learns" how to identify its location. It is assumed that the new bin location is initially a proper home location for the bin, and so the bin listens to beacons or other sources of location and sets this data to be its home location. Such association of bin servicing with bin controllers may come from a remote server, or may be initiated by a smart phone carried by service personnel, of initiated by a button. Identifying, to the bin controller, a bin service time, may be via the short-range radio, the long-range radio, or via a different communication path, or via a direct connection, such as a keyboard, connected to the bin controller. Activation of a bin service button, on the bin controller, may cause the bin controller to ramp up power to all radios and sensors. Since, most of the time, the bin controller is powered down, such a "wake up" mechanism may be important to force the bin to listen immediately to a communication to it. Any such "learning" of a home location may be based on a delay from the most recent service, or may be based on a time period during which it has not been moved, or both.

In one embodiment, a third radio is used for the bin to communicate with a bin service personnel. For example, a short-range radio may be Bluetooth. A long-range radio may be cellular data. A third radio may be WiFi. In one embodiment that uses a third radio, a service person "wakes up" the bin controller, which causes the bin to turn on its WiFi long enough to receive a message via WiFi. Such a message might be sent by nearby bin service personnel, such as via a personal electronic device.

It is often desirable to have the networks used by the bins to be different networks than those run by the customer. This provides superior data security and avoids potential technical or management interference between the customer's network and the bin network. For example, any WiFi used to communicate with a bin may be a different WiFi network than one used by the customer. Similarly, a backhaul network for Bluetooth beacons may be separate from a customer network. Note, however, that virtual networks may be used that run on the same backbone hardware as the customer's network, but are logically and logistically separate.

Radio antennas are ideally inside the bin to avoid damage to the antenna, and to simplify deployment. However, no such limitation is implied unless so explicitly stated. Optical devices that connect to a bin controller need to be either outside the bin, or operate through an appropriately transparent window or opening, or operate through the paper slot.

In one embodiment an IR remote control, such as a "universal remote" for televisions and other appliances may be used by bin service personnel to communicate with a bin through the paper slot. A smart phone, or similar electronics, suitably equipped, may be used in place of a universal remote.

In another embodiment, data communication by a bin controller is via audio. Audio signals are able to pass through plastic bin walls or through a paper slot for an adjacent communication device. In one embodiment, a smart phone may be used as such an adjacent communication device. Audio modulation to send and receive data is well-known to those in the art. Ideally, but not necessarily, any such audio communication is encrypted. An audio spectrum for communication may include spectra within human hearing range, spectra above human hearing range (ultrasonic); or spectra below human hearing range (subsonic), in any combination.

In yet another embodiment, audio communication is used in place of a short-range radio or in place of a third radio.

A paper bin ID and a bin controller ID may be separate or may be the same. A controller ID may be the same or different than a SIM card ID for a SIM module in the controller. Any ID may be an IPv6 address. Any ID may be set automatically used an appropriate protocol, such as DHCP or mobile DHCP. Any ID may be a phone number.

It is desirable that shredder bins do not require plugging in to an outlet, although fixed location bins may derive power from such a source. Some bins, including portable bins, may use an outlet to provide power to charge internal batteries. A preferred embodiment is the use of primary or rechargeable batteries, which may be permanently installed in a bin controller or replaceable. It is desirable that the batteries, of any type, hold their usable charge as long as possible. Therefore, it is desirable that the bin controller may separately power up various components within the bin controller, such as any radio; paper height sensor; distance sensor; any indicator outputs or any other inputs such as a service request button; memory; internal clock; accelerometer; or other electronic components or circuitry. A "power on" state means the element is functional for its intended purpose. A "power down" state means less power than a power-on or "wake-up" state. Such a power down or sleep state may be effectively zero power or may be a low power, "sleep," mode.

It is a preferred embodiment that paper height is measured periodically on a relatively frequent time interval, compared to regular, non-alert status messages sent via long-range radio. Alert, caution, warning, service-required, or error messages are ideally sent immediately upon any such trigger event or condition.

Paper (or other bin contents) height or fullness measurement devices include LIDAR, in all its forms; optical reflection; audio reflection (e.g. SONAR); parallax detection; optical scattering; optical brightness; weight; a counter of input events (e.g. placing paper in a slot); a document thickness detector; detection of motion, such as being bumped or having something placed into the bin; a metal detector; a beam broken detector; a change to an image from an image sensor; analysis of a photographic image of the inside of a bin; a hall effect sensor; resonant frequency of the bin or the empty space within a bin; material conductivity or capacitance; detection of a nearby person, or these devices or means in any combination. As one example, a sharps bin might count each time it is bumped, such as detected by an accelerometer; or it might count each time a lid is opened; or a metal object is sensed or something is placed into the sharps bin. That is, although we refer to, "paper height," this term encompasses any fullness measurement of material designed to be placed into a bin or commonly placed into a bin. A measured metric of fullness of a bin may require linearization, normalization, unit conversion, mapping, or calibration relative to typical bin usage. For example, consider a bin that counts usage events. In some departments typical use may be single sheet documents. In another department, typical use may be thick documents. By measuring any such typical use it is possible to then use a count of usage events as a proxy for bin fullness.

WiFi, or IEEE 802.11, in its various formats, as of the filing date of this application, is relatively power consumptive, particularly when compared to Bluetooth LE, for example. Thus, to conserve battery energy, WiFi is not generally preferred either for location determination or for communication. However, WiFi may be used under particular conditions, such as when beacons are not available or not trusted, or due to a change in technology. WiFi may be used if a bin is lost, in a warning state, in an error state, or is being serviced. WiFi electronics may be turned on briefly for a given purpose, and then turned off again. WiFi may be either a third or a fourth radio.

Shredder bins, compared to many pieces of equipment, rarely change state quickly. To conserve battery energy, the most common state of a bin controller is, "sleeping." That is, in a very low power state. A bin "wakes up" periodically, for the purpose of reading paper height, determining its location, running diagnostics or sending a status message. Some of these activities may then trigger another activity, which may keep the bin controller awake for a longer time period. The time intervals for these periodic activities typically vary by the activity.

In some embodiments, a location history is kept, either by the bin controller or by the remote server. Such a location history may be useful to track the movement of a bin, particularly one that is now lost, in a warning location, or rogue.

In some embodiments, a beacon or other location-determining device, is used in a bin service vehicle. Thus, a bin controller should "know" when it is being serviced at the vehicle. This then allows the bin to automatically reset various states, such as a "bin full" state or a "warning" state. In some embodiments, there is a delay between the bin service location and enabling a caution or warning security state, so that the bin may be returned to its home location without causing a warning message to be sent while the bin is in transit from the service vehicle to its home location.

In another embodiment, bins, ideally, stay in their home location. That is, they are serviced in their home location, rather than being taken to a service vehicle.

In yet another embodiment, bins have an ID code, or a code that is associated with a bin ID or bin controller ID, on the outside of the bin, in a machine readable format, such as a bar code, matrix code or an RFID. Such an external bin ID may be read by bin service personnel using an appropriate reader, including the use of a smart phone. In yet another embodiment, equipment in a service vehicle, or in a portable bin service piece of equipment (such as a larger, paper transport bin), automatically reads such an external bin code. For example, a "tipper," (a device that lifts and tips a bin to empty it) may automatically read the code that is external on the bin. This provides a high level of assurance that a particular bin has been emptied. In addition, such an external code may be read by a customer employee to assist in accurately identifying a bin.

In yet another embodiment, bins or bin controllers have a network ID, such as an IP address, which may be an IPv6 address. Such an address may be static or automatically assigned, such as by the use of a DHCP (or similar) protocol.

Figure 1:
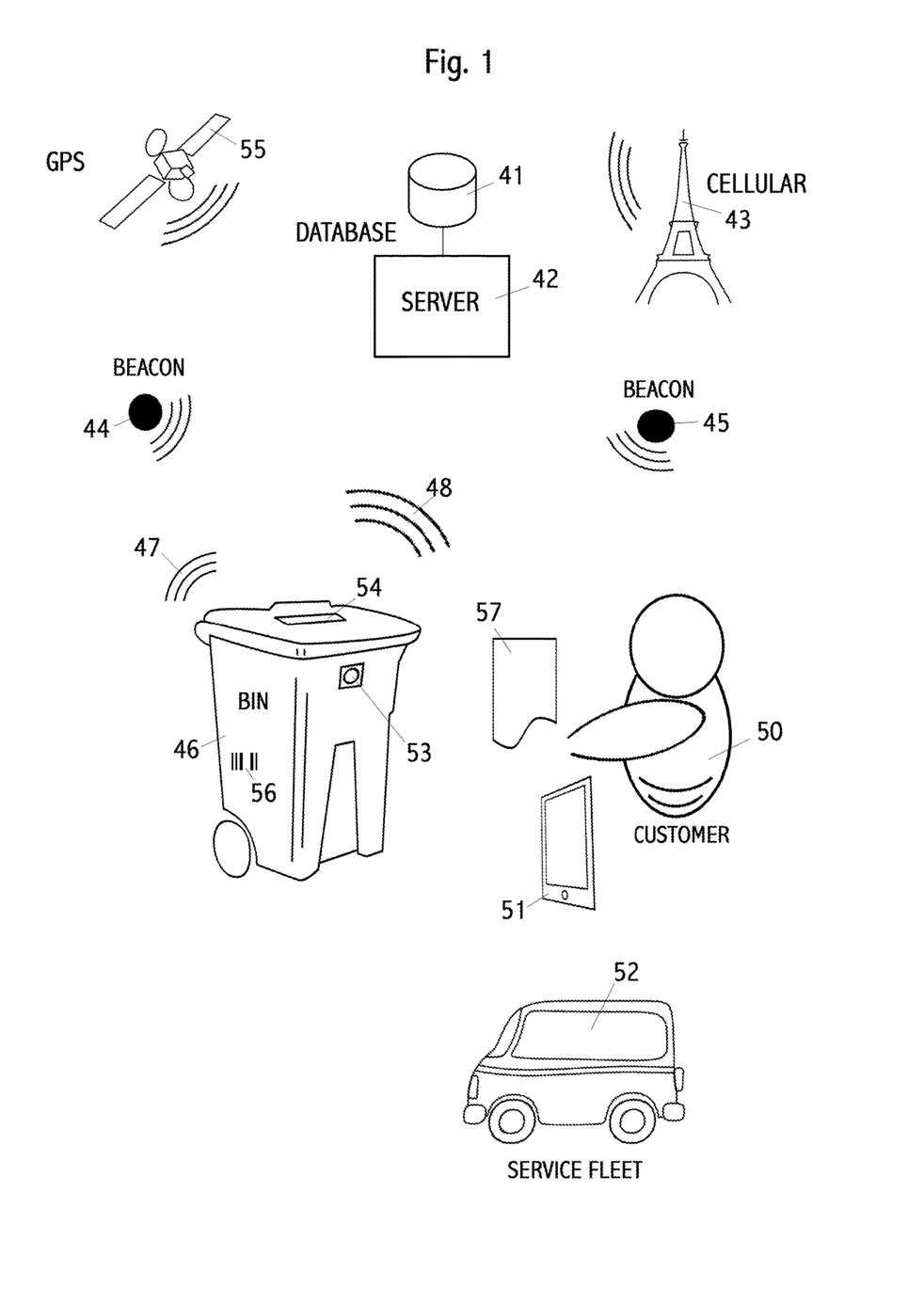
FIG. 1 shows elements of an exemplary system for preserving document confidentiality.

Turning now to FIG. 1, we see elements of a system for preserving document confidentiality. Shown elements are exemplary and non-limiting. Some systems have elements not shown in this Figure. A bin 46 holds paper, such as documents to be kept confidential. A user or customer 50 is at the customer site, ready to place a document 57 into bin 46 through bin slot 54, in order to preserve the confidentiality of document 57. This bin 46 is shown with wheels so it is portable. Not all bins are portable. This bin 46 also has an external service button 53 and an external barcode 56 to identify the bin. Either or both the service button and the barcode may be inside a bin, such as on, associated with, or adjacent to a bin controller. Bins may also have an ID in Arabic numerals, names, or other text identifier. Bins may have alternatively or additionally an RFID to function as a bin ID. An alternative or addition to this service button 53, is a "service complete" button used by a service person. Such a button may be used to indicate that he has serviced the bin.

The bin 46 has two radios, implemented at least partially in a bin controller, not shown in this Figure. One radio receiver is shown by symbol 47. A second radio transmitter is shown as symbol 48. Note that most radio protocols require both transmission and reception, even if message data flows only in one direction. The first radio may be Bluetooth, Bluetooth LE, WiFi, or other short-range communication, as is discussed elsewhere herein, including non-radio communication such as optical or acoustic. The second radio may be WiFi, cellular data, or other relatively long-range communication, as discussed elsewhere herein. A cellular tower 43 is shown, as the long-range radio 48 may be cellular data. Cellular data has many protocols and spectra. A non-limiting list includes: MSISDN, ICCID, IMSI, and IMEI for the "GSM" carriers and MDN, ICCID, MEID, IMSI, CAT M, 4G or 5G, and ESN for the "CDMA" carriers.

In one embodiment, the bin 46 listens to beacons via the short-range radio 47; and then transmits periodically a status or other message via its long-range radio 48. Typically, the time interval for location determination via the short-range radio 47 is shorter than the time interval for status communication via the long-range radio 48.

A customer 50 may use a smart phone, PDA or other personal electronic device, 51. In another embodiment, the personal electronic device 51 is used by service personnel of the bin service company. Bin service personnel may come to the customer site, not shown explicitly, using a service fleet 52 of vehicles.

Beacons 44 and 45 may be used to determine bin location, or used as part of a method or system of bin location determination. In one embodiment, bin 46 uses its short-range radio 47 to listen to beacon power. Based on a map, table or database, specific to each customer site, bin location maybe determined, at least to a necessary accuracy to set one of three (or more) security states, as discussed elsewhere herein, such as "home," "caution," and "warning" states. Other methods of location determination may be used, such as GPS, 55.

Bin status is maintained in a remote server 42 with an associated database 41, as discussed elsewhere herein. The server communicates, directly or indirectly, with the long-range communicated data, such connection not shown.

A bin 46 may have a lockable lid, not shown. It may have external antennas, although a preferred embodiment has all antennas internal to the bin.

Figure 2:
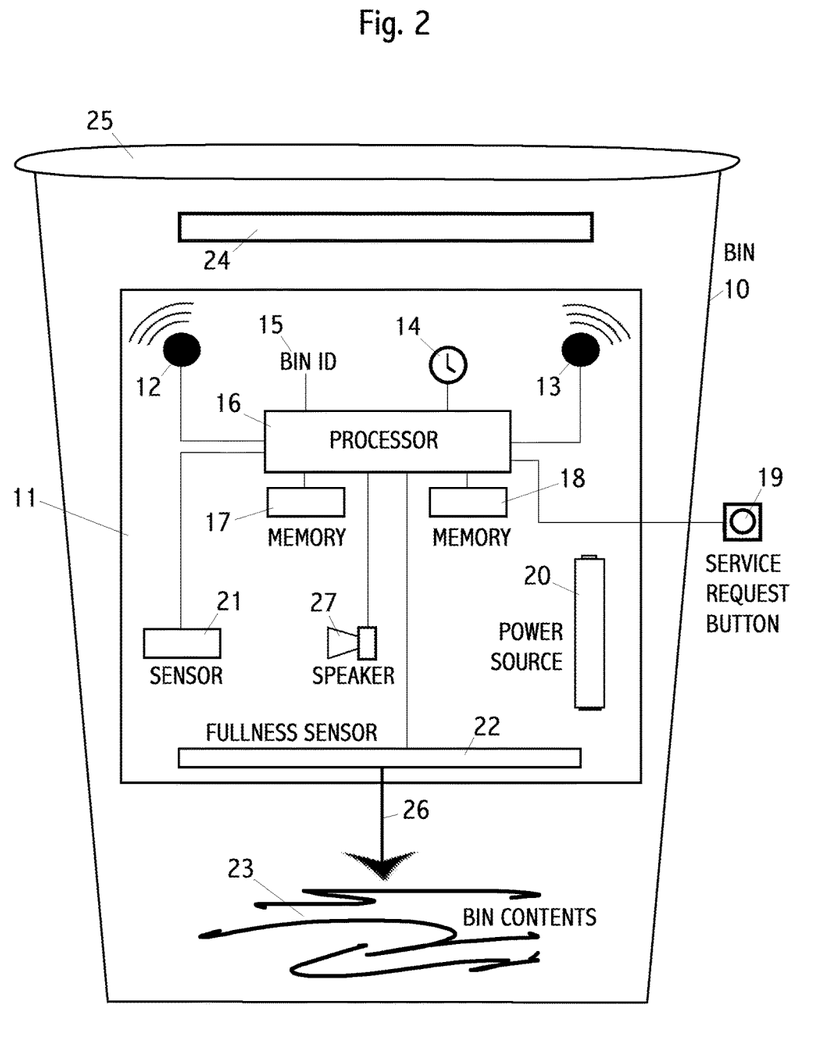
FIG. 2 shows exemplary elements of a bin controller.

Turning now to FIG. 2, we see an exemplary embodiment, shown symbolically, of a bin controller. As those in the art know, there are many alternative ways to implement a bin controller. A bin is shown symbolically as 10. It has a slot 24 for paper or other material appropriate for this bin usage. 11 shows an symbolic outline of a bin controller. The bin controller 11 comprises a processor 16, such as a CPU, MPU, DSP, microcontroller, embedded logic, ASIC, programmable logic, or other device with programmable, computational ability, as those in the art know. The processor 16 connects to or contains at least two types of non-transitory memory: 17 for program store and other non-volatile data, and 18 for RAM for volatile data. Memory 17 may be flash memory, EEPROM, battery-backed RAM, or other non-volatile technology. The processor 16 connects to or comprises a time-base 14, which is used to time periodic events, as discussed elsewhere herein. A time-base may comprise a local oscillator or crystal, or another periodic timer, or a time-receiver, which may use either the short-range or long-range radio, or both, to receive time information, or may receive time information from another source, such as GPS. A time-base may incorporate a circuit or chip for this purpose, or may be implemented using other components discussed herein. A time-base may be implemented entirely within the processor.

The bin controller 11 comprises or is connected to both a short-range radio 12 and a long-range radio 13. The symbols 12 and 13 imply both circuitry and antennas to implement their respective functions. Antennas or other communication transducers may be internal or external to bin 10. Some embodiments incorporate antennas into the controller; while some embodiments use antennas external the controller. Some embodiments have antennas external to the controller but internal to a bin. Some embodiments use alternatives to the radios, such as optical or acoustic communications, as discussed elsewhere herein. The bin controller 11 has or connects to a unique bin controller ID 15, which may be the same as an ID for the bin 10, or different. The bin controller ID 15 may be the same as a phone number, SIM ID, processor serial number, IP address, MAC address, or other identifier that has another purpose. Or, it may be unique and serve only as a bin controller ID. The ID maybe stored in non-volatile memory 17.

The bin controller 11 has or is connected to a power source, shown schematically as 20. This power source may be batteries, a hard-wired connection, solar power, or other source. As batteries, either primary or rechargeable batteries may be used. They may be field replaceable.

The bin controller 11 may have additional sensors, such as 21, which may be a input-only device, or an output-only device, or a device that can perform both input and output, or multiple sensors. Such a sensor may detect paper or other objects as they enter the bin through slot 24. It may detect attributes of such objects, such as size, thickness, weight, or material. Sensor 21 may detect when a lid on the bin in opened, or when the bin is moved. Sensor 21 may be an accelerometer. In may be an input or output acoustical device. It may be an input or output optical device, include a device sensitive in the visible spectrum, the infrared spectrum, or the ultraviolet spectrum. A service request button, which may be mechanical button, a touch button, or other type of finger-activated button, 19. Here, the service request button 19 is shown on the outside of the bin 10. Embodiments may use one, two or more "service" buttons, which may, in any combination, be inside or outside of a bin; one such service button may indicate, by customer personnel, that a bin needs service; another such service button may indicate, by bin service company personnel, that a bin has been serviced; such service buttons may be electronically connected or wireless; such service buttons may be implemented on a personal electronic device. In FIG. 2, one such service button is shown 19; other embodiments of service buttons are not shown.

A speaker or microphone 27, or both, may be in or connected to the bin controller 11. A speaker may be used to generate an audible alert. The speaker or microphone 17 may be responsive in the human acoustic range, or in a sub-audio range, or an ultrasonic range, or any combination. It may be comprise a PZT (piezoelectric transducer).

A key sensor or transducer in or connected to the bin controller 11 is a paper-height sensor 22, which may also be called a fullness detector, or distance sensor, as discussed elsewhere herein. As discussed and those trained in the art know, there are many ways to measure fullness of a bin. Many embodiments are for bins that hold items other than paper. One such sensor is LIDAR. Here, a distance from the bin controller 11 to the top of the bin contents 23 is shown as distance 26. The bin controller 11 may be mounted on the underside of the bin lid, shown schematically as 25.

In some embodiments a bin may detect when an item is placed in a slot, and may also be able to measure some attribute of that item. For example, for a paper bin, a thickness of paper may be measured. As another example, for a paper bin metal may be detected, as metal should not be placed into a paper bin. In some embodiments there is tamper detection, such a bin lid being opened when the bin is not being serviced. As yet another example, an accelerometer or other sensor may determine when a bin is being moved or has tipped over.

Ideally, a bin controller is free of any camera or imaging device that may comprise document security. Identification of document attributes, such as size or thickness, or a time stamp or time history of document use may also comprise document or customer security; thus, in some embodiments, a bin device, system or method is free of any combination of these potentially compromising elements. Freedom from one or more of such potentially confidentially-comprising elements are specifically claimed embodiments. Note that bins used in a medical setting may also have a need for confidentiality of data or history.

Figure 3:
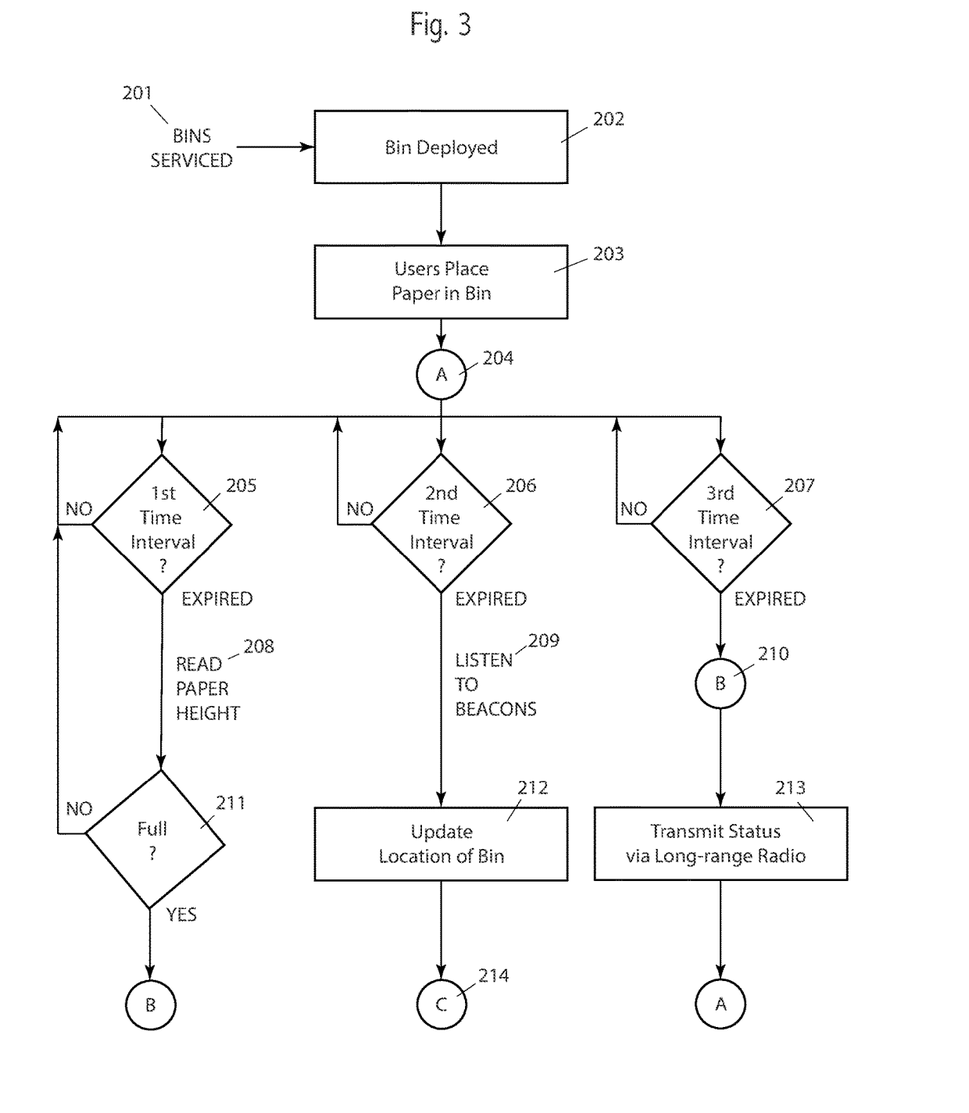
FIG. 3 shows a first portion of a method of operation of a bin controller.
Figure 4:
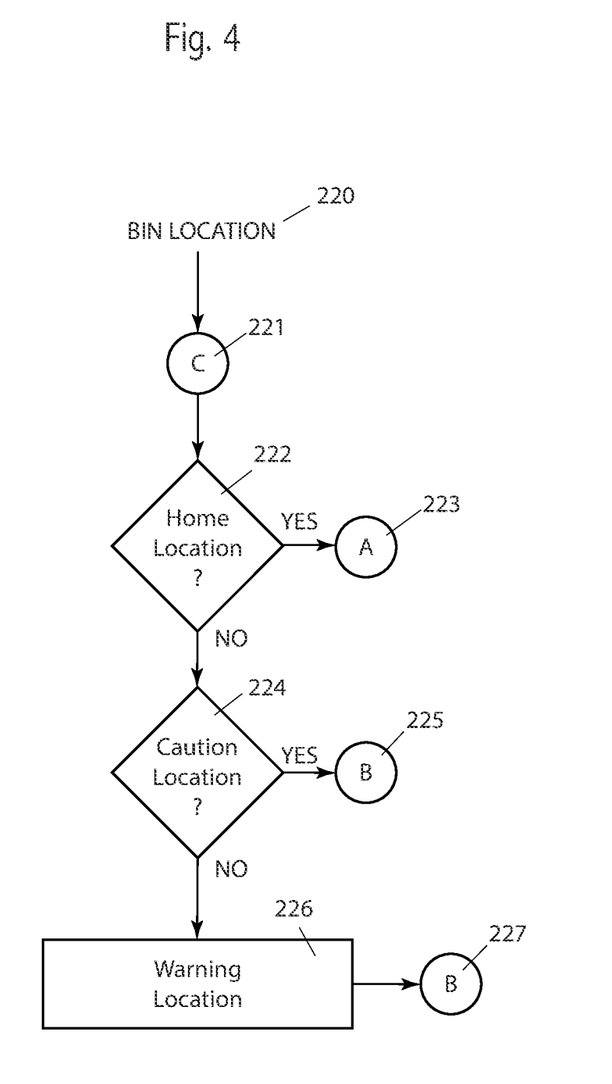
FIG. 4 shows a second portion of a method of operation of a bin controller.

Turning now to FIGS. 3 and 4 we see one exemplary method of operation of a bin controller. This Figure shows an embodiment for use in shredder bins; other embodiments are modified obviously. For example, instead of "paper," a bin may be adapted to hold medical "sharps," or industrial "scrap material." As discussed elsewhere herein, these methods may be used in applications significantly different than protection of document confidentially. Here, a bin is first deployed at a customer site, 202, by service personnel from a bin service company, 201. Once deployed 202, users or customers place paper document they wish to remain confidential into the bin 203.

Elements 201, 202 and 203 are applicable to embodiments incorporating a system or applicable to methods of use of a bin controller or bin. For stand-alone bin controller embodiments, start at location A, 204.

Embodiments include bin controllers and bins. Embodiments include systems of bin controller and bins. Embodiments include system comprising a plurality of bin controller and a remote server comprising an interface to a long-range radio, such that bin controller may send messages to the remote server. Embodiments include methods of operation of a bin controller and methods of operation of the system.

At point A, 204, the bin controller is in a normal operating mode. From this point three different events happen periodically, each with their own or shared time intervals, 205, 206 and 207. The time intervals may be the same, or optimally, different. One or more of these may be a "wake up" event, which may be a requirement for the other time intervals. The first periodic event is for the bin controller to wake up and measure paper height or bin fullness 208. The second periodic event is for the bin controller to wake up and listen to beacons 209, or otherwise determine its location.

The third periodic event is to wake up and transmit a status message 213, via a long-range radio. If a bin is full, or has reached a predetermined fullness threshold, such as 80%, or in the range of 40% to 100%, at decision 211, the method jumps to point B, 210, so that a status message may be sent immediately, communicating the fact that the bin has reached is fullness threshold. If the bin is not full, the method continues from A, 204. A status message may be sent 213 every time paper height is measured 208, whether the bin has reached a threshold capacity 211, or not.

Each time the bin controller wakes up 206 and listens to beacons 209, or otherwise determines location, it updates its location, 212. Then, the method continues at point C, 214, shown in FIG. 4. A status message may be sent 213 every time location is determined 212, whether the bin is in its home location or not.

When the bin controller wakes up 207 it may transmit a status message 213, which may be one of many different message types, such as communicating a bin fullness, bin ID, bin location, but otherwise indicating that everything is normal, for this bin, such as being not full and at its home location, and having sufficient battery power and no errors. Other message types may indicate a "caution" security state, or a "warning" security state, such a bin is lost or rogue, or the bin is full, or has a service request pending, or any of many different types of errors or conditions.

Some conditions, trigger events, or states cause one or more of the time intervals indicated as 205, 206 or 207 to change. For example, certain error conditions or a warning state may cause the status messages to be sent more often. Actions in some embodiments, such as sounding an audio alert, are not shown in these Figures.

Note that the three periodic events, 205, 206 and 207 happen logically in parallel, although they may be implemented as serial actions. As those in the art know, there are many ways to implement such timers in software or electronically. For example, they may be implemented as sequential logic or share timing functions, or be triggered by a common clock, time-base, wake-up event or other event.

Continuing the method in FIG. 4, we start with any known bin location 220. Point C, 221, is reached from FIG. 3. If the bin is in one of its home locations, the method continues from point A, 223, in FIG. 3 as 204. If the bin is not in one of its home locations then its location is checked to see if it is a caution location, step 224. If it is, the method continues from point B 225, shown in FIG. 3 as 210. If the bin is not in a home location or a caution location, then it is in a warning security state 226. The method continues from point B, 227, shown in FIG. 3 as 210. From point B, a message is transmitted immediately (see elsewhere herein) to communicate a caution or warning location and associated security state. In some embodiments there are multiple home locations or multiple caution locations, or both. In some embodiments there are more than three security states associated with bin locations. For example, a bin in service may be considered a fourth location or a fourth security state, or both. Note that a status message may be sent independent of decisions 222 and 224. An embodiment may include sending a status or state message on a change of status or state. For such an embodiment, after any such change is detected, the flow moves to B, 210. It is desirable that numerous state changes not be sent when is bin is near a state or location border, such as near the boundary between a safe and caution state. Therefore, it is desirable that hysteresis, or equivalent functionality, be implemented for detecting state changes or transmitting state changes.

Figure 5:
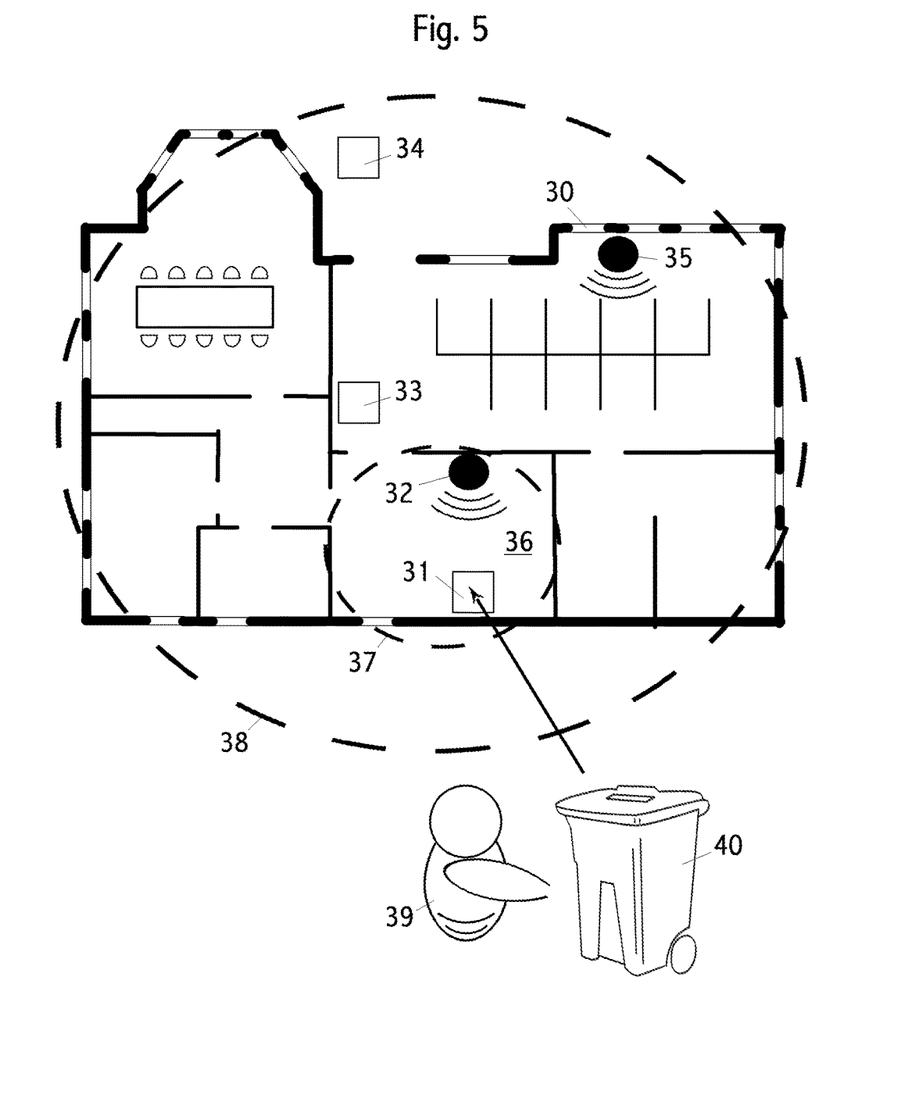
FIG. 5 shows exemplary bins in use at an exemplary customer site.

Turning now to FIG. 5, we see an exemplary floor plan of a customer site with three possible bin locations: 31, 33, and 34. The customer site is shown in an exemplary architectural wall outline 30. A home location 31 for a bin 40 is shown in a room 36, which might be a break room, for example. This room has a beacon 32. An approximate range for this beacon, possibly at one reference power level, is shown as dashed circle 37. A "home location" for bin 40 might be anywhere in the room. A user 39 at the customer site 30 is about to place an item, such as a secure document, in the bin 40.

Another location for bin 40 is shown as 33. Here, the bin is outside of the break room 36, but is within range of another beacon 35. This location may be classified as a "caution" location, causing a "caution message" to be sent by the bin 40. An alternative embodiment uses a single beacon, such a beacon 32. Here, the home range is indicated by broken circle 37, and a caution range is indicated by broken circle 38. Typically, the home range is effectively fully inside of the caution range. Note that the ranges shown by the broken circles 37 and 38 are schematic only, and may be in practice far from a circular area.

Another location for bin 40 is shown 34. Here, the bin is out of range of beacons 32 and 35, and is therefore "lost," or "rogue." it will send an appropriate "warning" message.

Dashed circle 38 shows a potential range for another communication means. For example, this might be the range of WiFi for the customer facility 30. It might an audio range of an audible alert for a bin.

Suitable time intervals for listening to beacons, or other location or distance determination: a range of 10 milliseconds to weekly, or the range of one second to daily, or the range of one minute to one hour, or 30 minutes or zero—that is, continuous or continual listening. Note that there may be a delay, up to such a time interval, before any other event is noticed or takes place, such as notification via a radio of a security state of a bin. However, in some embodiments motion or use may be detected, which then may cause a wakeup, which then may trigger listening to beacons or other events. Detection of such may be via an accelerometer or use of the slot, for example. The time interval for reading of beacons may be a "wake up" time interval for the processor.

Suitable time intervals for reading paper height (or fullness of bin) may be less than, equal to, or more than a time interval for reading beacons, or may be equal to or longer than a time interval to wake up. Suitable ranges include: one second to one week, or one minute to one day, or five minutes to one hour. Reading paper height may be continuous or continual. Fullness detection may take multiple samples from a sensor. For example, about 100 samples may be collected from a sensor over a 10 second sensing period. Note that there may be a delay, up to such a time interval, before any other event is noticed or takes place, such as notification via a radio of fullness of a bin. However, in some embodiments motion, use or a service request, such as via a service request button, may be detected, which then may cause a wakeup, which then may trigger determining fullness or other events. The time interval for detecting bin fullness may be a "wake up" time interval for the processor.

Suitable time intervals for sending a message via the long-radio (or a third communication radio) may be one second to one week, include: one second to one week, or one minute to one day, or five minutes to one hour. Sending a message may depend on a bin fullness or security state. For example, if a bin is less full than a threshold, which may be fixed or may vary by the rate of bin filling, then a message may not be sent. Similarly, if a security state is, "home," or "safe," then a message may not be sent. Since it is important in some embodiments to conserve battery energy, sending a status message may occur at the same or longer time interval than determining location or determining bin fullness, although an alert condition, such as a bin is more than a threshold of fullness or the security state is other than, "home, or, "safe," may cause an immediate message to be sent. A bin may send a message every time the processor wakes up, or less often. The time it takes to send a message depends on both the communication technology and available bandwidth, and the amount of data to send in the message. There may be two message types: a "report" or "current status" message, and a "history" or "detailed" report.

A range of power up time, after the processor wakes up, may be in the range of 10 milliseconds to one hour, or the range of one second to three minutes, or in the range of five seconds to 30 seconds. Power up time is likely to variable, based on bin state, or communication time or delays, including channel busy delays. If a bin is receiving a firmware update, a wake up time may be considerably longer. If a bin is lost or rogue, it may stay awake or a wake-up time interval may be shorter, such in the range of 50 milliseconds to one hour, or the range of 0.5 seconds to 15 minutes, or the range of five seconds to five minutes.

In some embodiments, recorded paper height or other collected data may be stored, and then a history is transmitted comprising such recorded data or events. This minimizes the number of messages sent and thus conserves battery power. Such history may have other management benefits.

Other radio technologies include Zigbee, or Internet of Things (IoT) technologies. In one embodiment, a processor has two power modes: awake and asleep. Other embodiments use more than two power modes. Individual circuits within a bin controller may be powered up separately. In particular a long-range radio may be powered up only when used to send or receive a message.

Exemplary Embodiment

Suitable hardware components for one exemplary embodiment are listed below in Table 1. As those trained in the art know, such components or similar components are available from multiple vendors, and functional operation may be achieved with significantly different hardware design and components. Not all embodiments require all components. The term, "enclosure," may refer to a bin adapted to receive secure material, or may refer to a box for electronics of the bin controller. The context of use is necessary to determine which meaning is appropriate.

TABLE I

| | Exemplary Hardware |
|---|---|
| Power source | Replaceable or non-replaceable primary or rechargeable batteries. Examples include alkaline batteries, lead-acid batteries, and Lithium batteries, of which there are numerous suitable lithium technologies. |
| Long-range radio | Cellular data radio such as LTE (Long Term Evolution cellular data) CAT M or LTE CAT M1. |
| Short-range radio | Bluetooth 4.2 or 5.0 compliant. |
| Antennas | (1) compatible with long-range radio, such as LTE bands B2, B4 and B12; (2) compatible with short-range radio, such as meeting TRP/TIS TIS (Total Radiated Power / Total Isotropic Sensitivity) specification from the Bluetooth SIG (Special Interest Group); may be internal to bin controller box, or external to the bin controller box, but internal to the bin that is controller by the bin controller. |
| Depth Sensor | Capable of measuring a target range of zero to 200 cm. Depth sensors in some embodiments, such as for secure documents, do not use photographic technology and is not capable of capturing an image. For other embodiments or applications, photographic or image-sensors may be used to measure height, depth or fullness. |
| Service complete | A button, sensor, or other means for service personnel to indicate that service of a bin is complete. |
| Service request | An external (to a bin controller or a bin) push-button or touch sensor. Alternatively, a service request may be made via a personal electronic device or other wireless connection. |
| Status indicator | At least one LED or other human visible indicator, or audio indicator, or transmission to a personal electronic device, is adapted to provide diagnostic information. |
| Box | An box for a bin controller and associated electronics; adapted to be mounted inside a bin, such as on the underside of a bin lid. |
| Processor | An electronic programmable processor with sufficient non-volatile and volatile memory and processor interface circuitry to meet the requirements of the device, and system and methods of use. |
| Alarms | An audio output alarm may be included, such as from a PZT (piezoelectric transducer) or audio speaker. An optical alarm output may be included, such as an indicator visible on the outside of a closed bin, such as an LED or optical flash. Alarms may also be generated to display on a local personal electronic device. |
| Motion sensor | An optional accelerometer may be used to detect bin tipping and bin motion. |
| Audio | Audio send/receive for data, or for a local alarm, may be via an audio speaker, audio microphone, PZT device, or an ultrasonic transducer. |

Table 2 below provides one exemplary list of fields in one or more messages. As those in the art know, there are many ways to code fields, depending on the contents, for example: as integers, time, dates, floating point, bit maps, coordinates, pointers, vectors, abbreviations, names, addresses, objects, Unicode, executable data, and strings. Messages may be any combination or subset of these fields, or other fields. Different types of messages may have different fields. A single or multiple data packets may be necessary for a complete message.

TABLE 2

| Exemplary Fields in Messages |
|---|
| Firmware Version Number |
| Sequence Number - increments once per wake |
| Type of message (right now always 0 = normal) |
| Protocol Version = 3 describing this layout of fields included in report |
| Time report was published |
| Time report was generated |

TABLE 2-continued

Exemplary Fields in Messages

ToF Sensor average distance measured over 5 seconds (~100 samples)
ToF Sensor minimum distance measured over 5 seconds (~100 samples)
ToF Sensor maximum distance measured over 5 seconds (~100 samples)
true if we were able to communicate with the sensor
true if we woke up from a button press, and not from a schedule
Number of seconds since the last button press (used to get the last time a driver visited if report with wokeFromButton = true was lost)
Cellular RSSI
Average of Battery voltage measurements made since unit woke
ReportType = 0 (default, woke from schedule), 1 (woke from button press), 2 (report taken about 1 minute after button press), 3 (report taken about 20 minutes after button press), 4 (significant change in bluetooth beacon signal strength detected)
Debug information - memory retained between wake cycles was reset to default for some reason
Debug information - running count of distance sensor failures, increments once per wake if distance sensor could not be read
Debug information - number of times cellular connection failed in first section
Debug information - number of times cellular connection failed in second section
Debug information - number of times cellular connection failed in third section
Debug information - number of times cellular connection failed in fourth section
Debug information - number of times cellular connection failed trying to connect to cloud
Debug information - number of times cellular connection failed trying to publish reports
Debug information - number of times connection failed by reaching maximum wake time (we current set to 3 minutes), and system went to sleep to save battery life
always false
Debug information - time elapsed while system was starting up
Debug information - time elapsed while connecting to cellular
Debug information - time elapsed while connecting to cellular, second part
Debug information - time elapsed while connecting to cellular, third part
Debug information - time elapsed while connecting to Particle cloud
Constant based on the hardware version (PCB version)
Minimum of Battery voltage measurements made since unit woke
Maximum of Battery voltage measurements made since unit woke
ID of first entry from BLE Table (3-unit table containing home beacon if home beacon seen and the up to two beacons with strongest RSSI, or if home beacon not seen, up to three beacons with strongest RSS)
Average RSSI of first entry from BLE Table
ID of second entry from BLE Table
Average RSSI of second entry from BLE Table
ID of third entry from BLE Table
Average RSSI of third entry from BLE Table
Sample count of first entry from BLE Table
Minimum RSSI of first entry from BLE Table
Maximum RSSI of first entry from BLE Table
Sample count of second entry from BLE Table
Minimum RSSI of second entry from BLE Table
Maximum RSSI of second entry from BLE Table
Sample count of third entry from BLE Table
Minimum RSSI of third entry from BLE Table
Maximum RSSI of third entry from BLE Table
Report Sequence Number - increments once per report
Debug information - number of times cellular connection failed by entering listening mode (usually this is from SIM communication failure)
Debug information - time elapsed during last publish
Debug information - time elapsed during last publish cycle shutting down connection and going to sleep
Debug information - number of times device failed to enter sleep
Debug information - the error code from the last wake cycle
Debug information - true if the device received a message from the cloud that new firmware is queued up
Minimum of Battery voltage measurement made during last report/publish cycle, including after last report was generated
The ID of the home beacon

Additional Embodiments

Embodiments are specifically claimed for both "portable," and "non-portable" security bins. Note that a "non-portable" bin may still be moved. Specifically claimed are embodiments where the word, "portable" is removed from a claim, claim language, or embodiment language.

Embodiments are specifically claimed for both: "bins," and "bin controllers," independent of particular language used.

A, "shredder bin," may or not, itself, shred paper. A shredder bin service company may collect un-shredded paper from the bins and then shred the paper, either at the facility where bins are deployed, a "customer site," or remotely. There are two problems with prior art shredder bins solved by embodiments of this invention. First, paper height in bins is monitored electronically and status, notification or warnings are sent via radio. Second, the physical location of bins at a customer site is monitored electronically to be sure they are at an ideal or permitted location within a business or building. Shredder bins, or simply, "bins," typically have an electronic bin controller, an electronic paper height sensor, and one or two radios. One radio may be used to assist in determining bin location within a building. This radio may take advantage of "beacons," located at various fixed locations within the building. The bin controller monitors the received radio signal strength from one or more beacons, which then is able to provide an approximate location of the bin relative to the one or more beacons. Such beacons and compatible listening radios may use Bluetooth, WiFi, or other radio frequencies and protocols. A beacon radio may be considered a "short-range" radio.

Bins may communicate with a central or distributed bin service organization using a second radio, such as cellular data, WiFi, or another radio frequency or protocol. This second radio, which is typically supports two-way communication, may be called a "long-range" radio. An important requirement for some embodiment is that the long-range radio is effective, even if no short-range radio is within radio range.

In a typical application, there are two key pieces of information transmitted by a bin: its paper height and location. Such information ultimately ends up stored on one or more servers, which may be, "in the (internet) cloud." Alternatively, or additionally, information may be stored in one or more personal electronic devices, such as smart phones. For both pieces of information, proxy data may be used. For example, paper height may be a numerical output from a paper height sensor, rather than a physical measurement in centimeters. A bin fullness or "emptiness," metric, which may be proportional, may be used in place of paper height. Also, the bin may not transmit its location per se, but rather one or more power levels from one or more beacons. It is then up to a "down stream" device or process, such as a remote server, to translate such proxy data into appropriate data for use by a bin service organization. For example, a server may have a logical "map" or "table" for a facility to correlate received beacon power to either physical location in a building, or simply to a status, such as an "home location" (for the bin); or a "caution location;" or a "warning location." A home location, or "safe location," might mean that the bin is in an allowed, ideal, or functional location. A caution location may be a cautionary location where the bin is in a less than ideal location, but that document confidentially is not immediately at risk. A warning location may mean that the bin is not in an acceptable location and requires service. That service may be to place the bin back into an acceptable location, or in some cases, the bin is "lost," or "rogue" and must be first located, typically by either by manual search, or by the use of a portable radios, or both. A transmitted beacon, or audio indicator, or optical indicator, may additional or alternatively be used, in any combination.

One embodiment does not use a paper-height sensor, but does detect and monitor bin location. Other embodiments do not monitor bin location, but do monitor paper height. Such an embodiment may be used for shredder bins that are not portable, and therefore have little chance of getting moved or becoming rogue bins.

In another embodiment, a portable shredder bin is within radio range of at least one permanent radio beacon. The bin controller, attached to the bin, detects received radio power from the beacon(s). With this data, the bin controller, or a remote server, may determine approximate distance and potentially approximate location of the bin. Distance from a beacon may be detected by methods other than received radio power, such as time-of-flight, or direction of a beacon relative to the bin, or radio wave reflections. Beacons may be optical or acoustical.

Additional Method and System Embodiments

1. A method of preserving confidentially of documents, comprising the steps:
   placing confidential paper documents into a portable shredder bin; wherein the portable shredder bin comprises: (a) a slot for placing material in the bin, (b) an operable lock, (c) a bin contents height sensor, (d) a short-range radio; (e) a long-range radio, (f) a bin controller ID, and (g) a bin controller with non-transitory memory and a time-base;
   monitoring periodically at a first time interval by the bin controller a paper height in the portable shredder bin responsive to the paper height sensor;
   listening periodically at a second time interval to a short-range radio beacon via the short-range radio; wherein the radio beacon comprises a broadcast radio ID;
   determining a bin-distance, wherein the bin-distance is a distance between the portable shredder bin and a broadcast radio, responsive to the listening;
   selecting one of three bin security states: (a) a close, "home," distance; or (b) a medium, "caution," distance; or (c) a long, "warning," distance; responsive to the bin-distance; wherein the three bin security states are mutually exclusive; wherein the selecting is responsive to the determining a bin-distance;
   sending a bin security message, via the long-range radio, responsive to a change in the security state; the selection of the bin security state, if any;
   sending a contents-height message, via the long-range radio, responsive to bin contents height sensor;
   transmitting periodically at a third time interval a bin status message via the long-range radio; wherein the bin status message comprises: (a) the bin controller ID; (b) the broadcast radio ID; and (c) a bin contents height; and
   emptying the portable shredder bin responsive to the paper height.

Method Embodiments

2. The method of embodiment 1, comprising the additional step:
   validating a portable shredder bin location, responsive to a bin validation dataset in a server; additionally responsive to the bin status message; wherein the bin validation dataset comprises a list of beacon IDs associated with the bin controller ID.

3. The method of embodiment 1, comprising the additional step:
   detecting a beacon radio power of a beacon radio;
   wherein the determining a bin-distance is further responsive to the detecting.

4. The method of embodiment 1, comprising the additional step:

broadcasting a bin broadcast message via the short-range radio, by the portable shredder bin, responsive to a command to the portable shredder bin.
5. The method of embodiment 1, comprising the additional step:
broadcasting a bin broadcast message via the short-range radio, by the portable shredder bin.
6. The method of embodiment 1, comprising the additional steps:
maintaining a bin full list in the server comprising: bin status messages and message receipt times; responsive to the communicating; and
computing a location fill rate responsive to the rate-of-location-fill list; and
wherein the location fill rate comprises a rate of paper height change and the bin controller ID.
7. The method of embodiment 1, comprising the additional steps:
maintaining a paper-height list in the server comprising: the paper-height, the bin controller ID, and a timestamp; responsive to the bin status message; and
scheduling a bin empty time responsive to the paper-height list.
8. The method of embodiment 1, comprising the additional step:
Creating a map on the server, wherein the map comprises map data records; each record comprising: one or more bin controller IDs, one or more broadcast radio IDs; and one or more broadcast radio powers;
wherein the selecting step is further responsive to the map.
9. The method of embodiment 1, comprising the additional steps:
listening second to a second short-range radio beacon via the short-range radio; wherein the second radio beacon comprises a second broadcast radio ID;
determining a second bin-distance, wherein the second bin-distance is a second distance between the portable shredder bin and a second broadcast radio, responsive to the listening second;
wherein the bin status message further comprises (d) a second broadcast radio ID;
wherein the first and second listening steps may be performed in either order.
10. The method of embodiment 1, wherein:
the periodicity of the monitoring and the periodicity of the listening are separate periods.
11. The method of embodiment 1, comprising the additional steps:
maintaining a rate-of-location-fill list in the server comprising: bin status messages and message receipt times; responsive to the communicating; and
computing a location fill rate responsive to the rate-of-location-fill list; wherein the location fill rate comprises a rate of paper height change and the bin ID.

Additional Method Embodiments

12. A method of preserving confidentially of documents, comprising the steps:
placing confidential paper documents into a shredder bin; wherein the portable shredder bin comprises: (a) a slot for paper, (b) an operable lock, (c) a paper height sensor, (d) a radio; (e) a bin controller ID, and (f) a bin controller with non-transitory memory and a time-base;
monitoring periodically at a first time interval by the bin controller a paper height in the shredder bin responsive to the paper height sensor;
sending a paper-height alert message, via the radio, responsive to the paper height;
transmitting periodically at a second time interval a bin status message via the radio; wherein the bin status message comprises: (a) the bin controller ID, and (b) the paper height;
emptying the shredder bin responsive bin status message.
13. A method of preserving confidentially of documents, comprising the steps:
placing confidential paper documents into a portable shredder bin; wherein the portable shredder bin comprises: (a) a slot for paper, (b) an operable lock, (c) a short-range radio; (d) a long-range radio, (e) a bin controller ID, and (f) a bin controller;
listening periodically at a first time interval to a short-range radio beacon via the short-range radio; wherein the radio beacon comprises a broadcast radio ID;
determining a bin-distance, wherein the bin-distance is a distance between the portable shredder bin and a broadcast radio, responsive to the listening;
selecting one of three bin security states: (a) a close, "home," distance; or (b) a medium, "caution," distance; or (c) a long, "warning," distance; responsive to the bin-distance; wherein the three bin security states are mutually exclusive; wherein the selecting is responsive the determining a bin-distance;
sending a bin security state message, via the long-range radio, responsive to the selection of the warning distance, if any;
sending a bin security state message, via the long-range radio, responsive to the selection of the caution distance, if any;
transmitting periodically a bin status message via the long-range radio; wherein the bin status message comprises: (a) the bin controller ID, and (b) the broadcast radio ID;
servicing the portable shredder bin responsive to the bin status message.

Device Embodiments

1. A shredder bin controller comprising:
a programmable processor with non-transitory memory;
a power source;
a bin fullness sensor;
a short-range radio;
a long-range radio;
a time-base;
a distance determining means adapted to determine a bin distance;
a bin controller ID;
wherein the shredder bin controller is adapted to receive data via the short-range radio and adapted to transmit data via the long-range radio;
wherein the shredder bin controller is adapted to transmit a first message comprising data responsive to the bin fullness sensor;
wherein the shredder bin controller is adapted to transmit a second message responsive to the bin distance;

wherein the shredder bin controller is adapted to mount entirely on the inside of a shredder bin, with an exception of a optional service request button.

2. The shredder bin controller of embodiment 1 wherein:
the shredder bin controller is adapted to power up the short-range radio periodically at a first time interval;
wherein the shredder bin controller is adapted to power up the long-range radio periodically at a second time interval;
wherein the shredder bin controller is adapted to periodically power up the distance determining means at a third time interval;
wherein the third time interval is shorter than the second time interval.

3. The shredder bin controller of embodiment 1 wherein: the shredder bin controller is adapted to transmit one of three different messages responsive to the bin distance; and further responsive to two different predetermined distance thresholds.

4. The shredder bin controller of embodiment 1 wherein: the shredder bin controller is adapted to shorten the first or second time interval when the distance exceeds one of the different predetermined distance thresholds.

5. The shredder bin controller of embodiment 1 wherein: the shredder bin controller is adapted to shorten the first, second or third time interval when a value from the bin fullness sensor exceeds a predetermined threshold.

System Embodiments

1. A system for managing shredder bins, the system comprising:
a plurality of shredder bins, wherein each shredder bin comprises (a) a slot for paper, (b) an operable lock, (c) a bin fullness sensor, (d) a short-range radio; (e) a long-range radio, (f) a bin controller ID, and (g) a bin controller;
a server, operatively connected to a database, and operatively connected to the long-range radio;
a service fleet;
wherein service of the shredder bins, by the service fleet, is scheduled, by software on the server, responsive to fullness messages received via the long-range radio from the shredder bins wherein the fullness messages comprise a metric, for each bin, a fullness value responsive to the bin fullness sensor in the each bin.
wherein service of the shredder bins, by the service fleet, is further scheduled, by software on the server, responsive to a rogue bin message received via the long-range radio from at least one shredder bin wherein the rogue bin message comprises a bin state, wherein the bin state is responsive to data received by the at least one shredder bin via its short-range radio.

2. A system for managing shredder bins, the system comprising:
a plurality of shredder bins, wherein each shredder bin comprises (a) a slot for paper, (b) an operable lock, (c) a bin fullness sensor, (d) a short-range radio; (e) a long-range radio, (f) a bin controller ID, and (g) a bin controller;
a server, operatively connected to a database, and operatively connected to the long-range radio;
a customer help desk;
wherein service of the shredder bins, by the customer, is requested, by software on the server sending a message to the help desk and the help desk contacting the customer liaison, responsive to a rogue bin message received via the long-range radio from at least one shredder bin wherein the rogue bin message comprises a bin state, wherein the bin state is responsive to data received by the at least one shredder bin via its short-range radio.

Definitions

Bin controller—electronics in a bin controller box, typically mounted inside a bin. Note that, in text, often, reference to a, "bin," means the, "bin controller." For example, "the bin transmits a status message."

Bin ID—identifies a bin. A bin ID may be a radio ID, a MAC address, an IP address; a SIM card ID; a phone number; a physical location, or another ID. Such a bin ID may have no other purpose, or be shared for another purpose.

Business or organization—an identifiable legal entity or a portion of one, or a location or set of locations or facilities. These may also be referred to as a client site, user site, or customer site. Typically, one or more bins are located at such a business where employees or other people place documents into the bin(s) to assure security or confidentially of that document. In particular, so that no human or electronic device will be able see, view or record any portion of that document, once it is placed in a bin. Typically bins are deployed indoors, but no such restriction is implied unless otherwise explicitly stated.

Distance—is a metric, which may be a scalar, vector, set, or area or volume, comprising a distance or range from a fixed, known location; or may be a single location. A distance may be a proxy for a distance in traditional units. Distance may be determined from one or more received radio powers; received beacon power; received beacon data; GPS data; matching of image data, such as photographs, with an image database that includes location; time of flight of a radio, optical or audio signal; radio or audio signal phase angle; an accelerometer; a map comprising available radio signals; an optical ranging transducer that uses either reflected light or parallax; dopier shift, or another method.

Distance threshold—a distance threshold determines which of multiple message types are transmitted by comparing a measured distance against the threshold. In particular, two different distance thresholds allows three different message types to be sent. Distance thresholds may vary significantly from one bin to another, or from one application to another. Predetermined distance thresholds may be responsive to a bin location, rather than a bin ID. Distance thresholds may need to be programmed into a bin controller each time it has a different home location, or is replaced by a different bin.

Document—Typically a traditional paper document. However, any object with desired security or confidentiality may be considered a "document" for purposes herein. For example, documents may include envelopes, posters, sticky notes, passports, tickets, photographs, and the like. Other objects, not normally considered to be documents, may be within scope of claims. For example, electronic circuit boards, clothing, electronic parts, batteries, recycled or recyclable materials, medical devices, food, food waste, manufacturing scrap, hazardous waste and biohazard material may be within the scope of claims, by replacing "document" with any such terms or other terms with similar scope;

and replacing "bin" with a suitable receptacle. Such scopes are explicitly claimed as embodiments. For example, "sharps" bins, commonly used in medical facilities, may be considered "bins" for embodiment, scope and claim purposes; with items placed in such a container replacing "documents" for embodiment, scope and claim purposes. A bin may be a dumpster or garbage can.

GPS—any portion of satellite system designed to provide location on the earth.

Inside a shredder bin—means that no component extends to the outside of shredder bin such that the component would then be normally physically accessible from outside the shredder bin, when the shredder bin is normally closed. For example, if a radio antenna is part of bin controller inside a shredder bin, then no part of the radio antenna may extend outside the bin, or be easily accessible from outside the bin via a hole in the bin.

Long-range radio—a second radio with associated radio spectrum, modulation and communication protocol, including optional encryption. A long-range radio has a longer range relative to a short-range radio.

Message—a data packet or group of packets comprising data fields. A message may be formatted and transmitted or received compatible with Bluetooth; or formatted and transmitted or received compatible with cellular data; or formatted and transmitted or received compatible with WiFi (IEEE 802.11); or formatted and transmitted or received compatible with another standard or a proprietary protocol. Messages may also be transmitted, or received, or both, using IR (infrared) optical communication, or audio communication. Messages may be standalone message types. For example, a status message may be different from a warning message. However, messages may comprise variations in a data field. For example, a bin might send only, "status messages," but these messages are adapted to include information to convey variable data such as paper height, battery status, warning signals, service requests, error data, and the like.

Paper height—paper height is a physical measurement of a height of paper in a bin from a bottom of the bin; a distance from the top of paper to maximum fill level; a volume of paper in a bin; or a fullness or emptiness percentage; or an equivalent or proxy thereof. Units of paper height may be a standard unit of measure or a non-standard, proprietary unit; and may be non-linear or uncalibrated, or both. Paper height may be for contents of a bin other than paper. For example for a sharps bin or trash bin, the "paper height" would then be a sharps height or trash height, respectively. Paper maybe widely construed to include material that is appropriate or common to place in a respective bin.

Server—a server is just a computer. It may be remote, such as in a data center, "in the cloud," or in a bin service company. It may be at a customer site. It may be distributed. That is, a "server" is not necessarily a single piece of hardware, but may be, for example, a process running on a virtual machine, or may be spread across multiple pieces of hardware, for example, in a redundant, high-availability database. A server might service every customer of a bin service company, or one customer, or only a portion of one customer. A server may be in a bin controller, or a separate piece of hardware inside a bin. A server might be inside a mobile bin service truck. A server might comprise a blockchain, or might be on one smart phone or distributed among multiple smart phones, to name just one possible network, compute and storage configuration.

Short-range radio—a first radio with associated radio spectrum, modulation and communication protocol, including optional encryption. A short-range radio has a shorter range relative to a long-range radio.

Shredder bin and bin—interchangeable terms, unless otherwise clear from the context. See also "document" definition for full scope of, "bin." The purpose of such a bin is to hold secure documents for destruction. A shredding operation may occur in the bin, or elsewhere.

Time intervals—time intervals for different purposes, such as measuring paper height or transmitting a message via a long-range radio, may be different time intervals or a same time interval. A preferred embodiment comprises different time intervals. Each sensor, radio or internal circuit in a bin controller may have a different power-up or usage time interval. Time intervals may be measured in units of a "wake up" time interval. Events associated with time interval may only occur at or following a wake up event.

Ideal, Ideally, Optimum and Preferred—Use of the words, "ideal," "ideally," "optimum," "optimum," "should" and "preferred," when used in the context of describing this invention, refer specifically to a best mode for one or more embodiments for one or more applications of this invention. Such best modes are non-limiting, and may not be the best mode for all embodiments, applications, or implementation technologies, as one trained in the art will appreciate.

All examples are sample embodiments. In particular, the phrase "invention" should be interpreted under all conditions to mean, "an embodiment of this invention." Examples, scenarios, and drawings are non-limiting. The only limitations of this invention are in the claims.

May, Could, Option, Mode, Alternative and Feature—Use of the words, "may," "could," "option," "optional," "mode," "alternative," "typical," "ideal," and "feature," when used in the context of describing this invention, refer specifically to various embodiments of this invention. Described benefits refer only to those embodiments that provide that benefit. All descriptions herein are non-limiting, as one trained in the art appreciates.

All numerical ranges in the specification are non-limiting examples only.

Embodiments of this invention explicitly include all combinations and sub-combinations of all features, elements and limitation of all claims. Embodiments of this invention explicitly include all combinations and sub-combinations of all features, elements, examples, embodiments, tables, values, ranges, and drawings in the specification and drawings. Embodiments of this invention explicitly include devices and systems to implement any combination of all methods described in the claims, specification and drawings. Embodiments of the methods of invention explicitly include all combinations of dependent method claim steps, in any functional order. Embodiments of the methods of invention explicitly include, when referencing any device claim, a substitution thereof to any and all other device claims, including all combinations of elements in device claims.

We claim:

1. A portable security bin comprising:
   a closed, lockable enclosure;
   a receiving slot in the enclosure that receives secure material;
   a contents height sensor that measures a height of the secure material in the enclosure; and
   an electronic bin controller, comprising:
      a short-range radio;
      a long-range radio;
      a processor;
      non-volatile memory;
      a non-volatile bin controller ID; a time-base;

wherein the electronic bin controller:

periodically monitors, at a first time interval, the height of the secure material;

periodically listens, at a second time interval, to receive, via to the short-range radio, a first radio beacon, wherein the first radio beacon comprises a first broadcast radio ID;

determines a first bin-distance, wherein the first bin-distance is a distance between the bin and a first broadcast radio, responsive to the short-range radio;

selects one of three mutually exclusive bin security states: (a) a home state, (b) a caution state, or (c) a warning state; responsive to the first bin-distance;

sends a bin-security message, via the long-range radio, responsive a change in the security state, comprising the bin security state; and periodically transmits, at a third time interval, a bin-status message, comprising: (a) the bin controller ID, (b) the first broadcast radio ID, and (c) the height of the secure material; and wherein the bin controller is affixed to the enclosure.

2. The portable security bin of claim 1, wherein:

the short-range radio measures a first radio beacon power; and wherein determining the first bin-distance is further responsive to the first radio beacon power.

3. The portable security bin of claim 1, wherein:

the bin-controller further receives a bin-controller command message; and wherein the bin-controller broadcasts, via the short-range radio, a bin broadcast message responsive to the command message.

4. The portable security bin of claim 1, wherein:

the bin-controller further measures and records a rate of-fill of the secure material.

5. The portable security bin of claim 1, wherein:

the bin-controller further receives, via to the short-range radio, a second radio beacon;

the bin-controller further determines a second bin-distance, a distance between the bin and a second broadcast radio, responsive to the short-range radio.

6. The portable security bin of claim 1, wherein:

the first and second time intervals are different.

7. The portable security bin of claim 1, further comprising:

a predetermined distance threshold value; and the bin-controller further selects one of three mutually exclusive in security states responsive to the predetermined distance threshold value.

8. The portable security bin of claim 1, further comprising:

a predetermined fullness threshold value; and the bin-controller further shortens any combination of the first, second and third time intervals responsive to a difference between the height of the secure material and the predetermined fullness threshold value.

9. The portable security bin of claim 1, wherein:

the bin-security message, the bin-status message, or both, are sent responsive to both the bin security state and the height of the secure material.

10. An electronic controller comprising:

a contents height sensor that measures a height of secure material in an associated secure enclosure;

a short-range radio;

a long-range radio;

a processor;

non-volatile memory;

a non-volatile controller ID;

a time-base;

wherein the electronic controller:

periodically monitors, at a first time interval, the height of the secure material;

periodically listens, at a second time interval, to receive, via to the short-range radio, a first radio beacon, wherein the first radio beacon comprises a first broadcast radio ID;

determines a first distance, wherein the first distance is a distance between the associated secure enclosure and a first broadcast radio, responsive to the short-range radio;

selects one of three mutually exclusive security states: (a) a home state, (b) a caution state, or (c) a warning state; responsive to the first distance;

sends a security message, via the long-range radio, responsive a change in the security state, comprising the security state; and periodically transmits, at a third time interval, a status message, comprising: (a) the controller ID, (b) the first broadcast radio ID, and (c) the height of the secure material; and wherein the controller affixes to the associated secure enclosure.

* * * * *